United States Patent
Wu et al.

(10) Patent No.: US 7,319,726 B1
(45) Date of Patent: *Jan. 15, 2008

(54) SOFT-OUTPUT DECODING METHOD AND APPARATUS FOR CONTROLLED INTERSYMBOL INTERFERENCE CHANNELS

(75) Inventors: Zining Wu, Los Altos, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 179 days.

This patent is subject to a terminal disclaimer.

(21) Appl. No.: 11/217,408

(22) Filed: Sep. 2, 2005

Related U.S. Application Data

(63) Continuation of application No. 09/901,507, filed on Jul. 9, 2001, now Pat. No. 7,099,411.

(60) Provisional application No. 60/239,254, filed on Oct. 12, 2000.

(51) Int. Cl.
*H03D 1/00* (2006.01)

(52) U.S. Cl. .................. 375/342; 375/262; 714/795

(58) Field of Classification Search .............. None
See application file for complete search history.

(56) References Cited

U.S. PATENT DOCUMENTS

| | | | |
|---|---|---|---|
| 4,295,218 A | 10/1981 | Tanner | |
| 4,601,044 A | 7/1986 | Kromer, III et al. | |
| 5,406,570 A | 4/1995 | Berrou et al. | |
| 5,537,444 A | 7/1996 | Nill et al. | |
| 5,757,821 A | 5/1998 | Jamal et al. | |
| 5,926,232 A | 7/1999 | Mangold et al. | |
| 5,930,272 A | 7/1999 | Thesling | |
| 5,933,462 A | 8/1999 | Viterbi et al. | |
| 5,949,831 A | 9/1999 | Coker et al. | |
| 5,974,540 A | 10/1999 | Morikawa et al. | |
| 5,983,385 A | 11/1999 | Khayrallah et al. | |
| 6,002,716 A | 12/1999 | Meyer et al. | |
| 6,009,549 A | 12/1999 | Bliss et al. | |

(Continued)

FOREIGN PATENT DOCUMENTS

JP    2004164767    10/2004

(Continued)

OTHER PUBLICATIONS

U.S. Appl. No. 09/559,186, filed Apr. 27, 2000, Nazari et al.

(Continued)

*Primary Examiner*—Kevin Kim

(57) ABSTRACT

A method of reducing complexity in a Viterbi decoding algorithm used in intersymbol interference channels is provided. The method includes the steps of identifying a survivor path for an input symbol, making a hard decision about a polarity of the input symbol based on the identified survivor path, identifying a plurality of dominant error events for which the opposite polarity would be determined for the input symbol, measuring a penalty metric value based on the identified survivor path for each of the plurality of dominant error events, choosing a dominant error event having a least penalty metric value from the identified plurality of dominant error events, and calculating an approximation to a logarithmic likelihood ratio for the input symbol based on the survivor path and the chosen dominant error event.

25 Claims, 4 Drawing Sheets

U.S. PATENT DOCUMENTS

| | | | |
|---|---|---|---|
| 6,021,518 | A | 2/2000 | Pelz |
| 6,023,783 | A | 2/2000 | Divsalar et al. |
| 6,028,728 | A | 2/2000 | Reed |
| 6,081,918 | A | 6/2000 | Spielman |
| 6,145,114 | A | 11/2000 | Crozier et al. |
| 6,161,209 | A | 12/2000 | Moher |
| 6,182,261 | B1 | 1/2001 | Haller et al. |
| 6,219,817 | B1 | 4/2001 | Holman |
| 6,427,220 | B1 | 7/2002 | Vityaev |
| 6,438,180 | B1 | 8/2002 | Kavcic et al. |
| 6,539,367 | B1 | 3/2003 | Blanksby et al. |
| 6,581,181 | B1 | 6/2003 | Sonu |
| 6,634,007 | B1 | 10/2003 | Koetter et al. |
| 6,691,263 | B2 | 2/2004 | Vasic et al. |
| 6,708,308 | B2 | 3/2004 | De Souza et al. |
| 6,715,121 | B1 | 3/2004 | Laurent |

FOREIGN PATENT DOCUMENTS

| | | |
|---|---|---|
| WO | WO 96/37050 | 11/1996 |
| WO | WO 00/19616 A2 | 4/2000 |
| WO | WO 00/19616 A3 | 4/2000 |

OTHER PUBLICATIONS

U.S. Appl. No. 09/730,597, filed Dec. 7, 2000, Burd et al.
U.S. Appl. No. 09/730,598, filed Dec. 7, 2000, Burd et al.
U.S. Appl. No. 09/730,603, filed Dec. 7, 2000, Wu et al.
U.S. Appl. No. 09/730,752, filed Dec. 7, 2000, Burd et al.
Andrew J. Viterbi, "An Intuitive Justification and a Simplified Implementation of the MAP Decoder for Convolutional Codes", IEEE Journal On Selected Areas In Communications, vol. 16, No. 2, Feb. 1995.
Zining Wu, "Coding And Iterative Detection For Magnetic Recording Channels", The Kluwer International Series In Engineering And Computer Science, Jan. 2000.
Zining Wu, Coding, Iterative Detection And Timing Recovery For Magnetic Recording Channels, A Dissertation, 1999.
David J.C. MacKay, "Good Error-Correcting Codes Based On Very Sparse Matrices", IEEE Transactions On Information Theory, vol. 45, No. 2, Mar. 1999.
Robert G. Gallager, "Low-Density Parity-Check Codes", 1963.
Shoemake and Heegard, "Computationally Efficient Turbo Decoding with Bi-Directional Viterbi Algorithm (BIVA)", IEEE, ISIT 1997.
L.H.C. Lee, Computation of the Right-Inverse of G(D) and the Left-Inverse of H'(D), Jun. 21, 1990, I.E.E.E. vol. 26, No. 13, pp. 904-906.
J. Hagenauer and P. Hoeher: "A Viterbi algorithm with soft-decision outputs and its applications," Proc. IEEE GLOBECOM '90, Dallas, Tex., pp. 47.1.1-47.1.7, Nov. 1989 IDS May 17, 2005.
Öberg, Mats, "Parity Check Codes for Partial Response Channels," IEEE Global Telecommunications Conference—Globalcom '99, pp. 717-722, 1999, (IDS May 17, 2005).

SOFT-OUTPUT DECODING METHOD AND APPARATUS FOR CONTROLLED INTERSYMBOL INTERFERENCE CHANNELS

This application is a continuation of U.S. patent application Ser. No. 09/901,507, filed Jul. 9, 2001, now U.S. Pat. No. 7,099,411 which claims priority under 35 U.S.C. § 119 (e) to U.S. Provisional Application Ser. No. 60/239,254, filed Oct. 12, 2000, the entire contents of each of which are incorporated by reference herein.

BACKGROUND

1. Field of the Invention

The present invention relates to a soft-output decoder for controlled intersymbol interference channels, and more particularly to an apparatus and a method for reducing complexity in a soft output Viterbi decoding algorithm used in partial response channels, such as those used to model magnetic recording channels.

2. Background Information

Transmission of digital data is inherently prone to interference that may introduce errors into the transmitted data. Error detection schemes have been suggested to determine as reliably as possible whether errors have been introduced into the transmitted data. One such scheme is known as convolutional coding.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent upon earlier bits in the sequence. Thus, when a few errors occur, the receiver can still deduce the original data by tracing back possible sequences in the received data.

Optimal decoding is often a very complex task, and may require large periods of time, which are not usually available. In order to overcome this problem, iterative decoding techniques have been developed. Rather than determining immediately whether a received bit is a zero or a one, the receiver assigns each bit a value on a multi-level scale representative of the probability that the bit is a one. A common scale is the logarithmic likelihood ratio (LLR). The LLR represents each bit by some integer in an interval such as, for example, {−32,31}. In this example, the value of 31 signifies that the transmitted bit was a one with very high probability, and the value of −32 signifies that the transmitted bit was a zero with very high probability, whereas the value of 0 indicates indeterminacy as to whether the transmitted bit was a zero or a one.

Data represented on the multi-level scale is referred to as "soft data". Iterative decoding is usually soft-input/soft-output; i.e., the decoding process receives a sequence of inputs corresponding to probabilities for the bit values and provides as output corrected probabilities which take into account the constraints of the code. Generally, a decoder which performs iterative decoding uses soft data from former iterations to decode the soft data read by the receiver. The iterative decoding is carried out for a plurality of iterations until it is believed that the soft data closely represents the transmitted data.

Decoding techniques for convolutional codes are very well known in the literature and are the subject of many patents. For example, see U.S. Pat. Nos. 6,182,261; 6,161,209; and 6,145,114, the contents of each of which are incorporated herein by reference. In addition, several commonly assigned copending patent applications relate to this subject matter. These include U.S. patent application Ser. No. 09/730,597, filed on Dec. 7, 2000, and entitled "Address Generator for LDPC Encoder and Detector and Method Thereof"; U.S. patent application Ser. No. 09/730,752, filed on Dec. 7, 2000, and entitled "LDPC Encoder and Method Thereof"; U.S. patent application Ser. No. 09/730,603, filed on Dec. 7, 2000, and entitled "LDPC Detector and Method Thereof"; and U.S. patent application Ser. No. 09/730,598, filed on Dec. 7, 2000, and entitled "Parity Check Matrix and Method of Forming Thereof", the contents of each of which are incorporated by reference herein.

Reference is now made to FIG. 6, which is a block diagram of a data transmission system as described in more detail in commonly assigned copending application "Address Generator for LDPC Encoder and Decoder and Method Thereof", filed on Dec. 7, 2000 and assigned application Ser. No. 09/730,957, the contents of which are incorporated herein by reference. In general as shown therein, a digital data transmission system comprises a transmitting section 300' for transmitting user data to receiver 500' via communication channel 401.

The operation of transmission section 300' will now be explained. Prior to processing by transmitting section 300', input or user data maybe encoded with an error correcting code, such as the Reed/Solomon code, or run length limited encoded (RLL) or a combination thereof by encoder 302. Addresses for the parity equations of linear block code encoder 304 are generated by address generator 328 in accordance with an index of the bits of data, the index being determined by address generator 328. Address generator 328 is responsive to counter 730 under the control of controller 740. Controller 740 synchronizes counter 730 to the output of encoder 302 so that counter 730 can provide a count of the number of bits in a codeword output by encoder 302 and a count of the number of codewords.

Linear block code encoder 304 utilizes the user data and address from address generator 328 to provide the parity bits to multiplexer 306. Linear block code encoder 304 is preferably implemented as a low-density parity-check code (LDPC) encoder as described in commonly assigned, copending patent application entitled "LDPC Encoder and Method Thereof", filed on Dec. 7, 2000 and assigned application Ser. No. 09/730,752, the contents of which are incorporated herein by reference. The parity data from linear block code encoder 304 is combined with the data encoded by encoder 302 by multiplexer 306 for input to channel transmitter 310. Preferably, the combined data consists of series of a pair parity bits followed by 40 bits of user data. This constraint is established by encoder 302.

Transmitter 310 transmits the combined user and parity data from multiplexer 306 typically as an analog signal over communication channel 401 in the channel domain. Communication channel 401 may include any wireless, wire, optical, magnetic and the like.

Receiver 500' comprises an analog to digital converter 502 to convert the data transmitted on communication channel 401 to a digital signal. The digital signal is input to soft channel decoder 504, which provides soft or probabilistic information of the detected data to soft linear block decoder 506. Soft channel decoder may be implemented as a Soft Viterbi Detector or the like, and address generator 530 may be constructed similarly as address generator 328 in transmission section 300'. The soft information output by soft channel decoder 504 remains in the channel domain and is decoded by soft linear block code decoder 506, in accordance with the address of the parity equations generated by address generator 530. Address generator 530 is responsive to counter 735 under the control of controller 745. Controller 745 synchronizes counter 735 to the output of soft channel decoder 504 so that counter 830 can provide a count of the number of bits in a codeword output by soft channel decoder 504 and a count of the number of codewords.

Soft linear block code decoder 506 operates in combination with soft channel decoder 504 and address generator 530 in an iterative fashion. Soft linear block code decoder is preferably implemented as a low-density parity-check code (LDPC) decoder as described in commonly assigned, copending patent application entitled "LDPC Decoder and Method Thereof", filed on Dec. 7, 2000 and assigned application Ser. No. 09/730,603, the contents of which are incorporated herein by reference.

After the iterative process has completed, the output of soft linear block code decoder 506 is passed on for further processing to decoder 508. Decoder 508 is implemented to perform the reverse operations of encoder 302 or correct for any data errors.

One type of communication channel for which soft-output decoding of convolutionally encoded data is often employed is the controlled intersymbol interference (ISI) channel. One special class of controlled ISI channels that is commonly used is that of the partial response (PR) channels, which are used to model magnetic recording channels. Because of the redundancy inherent in a convolutional code and the iterative nature of the decoding process, the decoding method used may be highly complex, and therefore consume an unacceptably high level of computing resources. Accordingly, there is a need for a new soft-output decoding method having reduced complexity while continuing to yield low bit error rates for PR channels.

SUMMARY OF THE INVENTION

The present invention is intended to address the need for a soft-output decoding method having reduced complexity.

In accordance with a first aspect, the invention provides a decoder for decoding convolutionally encoded data from a communication channel. The channel is associated with a predetermined plurality of dominant error events. The decoder includes a Viterbi detector, which is configured to detect a survivor path for an input symbol and to make a hard decision about a polarity of the input symbol based on the survivor path. The decoder also includes circuitry configured to determine which of the plurality of dominant error events are possible dominant error events with respect to the input symbol, circuitry configured to determine which of the possible dominant error events has a least penalty metric with respect to the survivor path, and a calculator. The calculator is configured to compute an approximation to a logarithmic likelihood ratio for the input symbol based on the survivor path and the determined possible dominant error event having the least penalty metric. The communication channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a second aspect, a read channel for a hard disk drive is provided. The read channel is associated with a predetermined plurality of dominant error events. The read channel includes a decoder for decoding data accessed by the read channel. The decoder includes a Viterbi detector, which is configured to detect a survivor path for an input symbol and to make a hard decision about a polarity of the input symbol based on the survivor path. The decoder also includes circuitry configured to determine which of the plurality of dominant error events are possible dominant error events with respect to the input symbol, circuitry configured to determine which of the possible dominant error events has a least penalty metric with respect to the survivor path, and a calculator configured to compute an approximation to a logarithmic likelihood ratio for the input symbol based on the survivor path and the determined possible dominant error event having the least penalty metric. The read channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a third aspect, a disk drive for accessing data is provided. The disk drive includes a read channel, which is associated with a predetermined plurality of dominant error events. The read channel includes a decoder for decoding data accessed by the disk drive. The decoder includes a Viterbi detector, which is configured to detect a survivor path for an input symbol and to make a hard decision about a polarity of the input symbol based on the survivor path. The decoder also includes circuitry configured to determine which of the plurality of dominant error events are possible dominant error events with respect to the input symbol, circuitry configured to determine which of the possible dominant error events has a least penalty metric with respect to the survivor path, and a calculator configured to compute an approximation to a logarithmic likelihood ratio for the input symbol based on the survivor path and the determined possible dominant error event having the least penalty metric. The read channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a fourth aspect, the invention provides an apparatus for reducing complexity in a Viterbi decoding algorithm used in a communication channel. The apparatus includes means for identifying a survivor path for an input symbol, means for making a hard decision about a polarity of the input symbol based on the identified survivor path, means for identifying a plurality of dominant error events for which the opposite polarity would be determined for the input symbol, means for measuring a penalty metric value based on the identified survivor path for each of the plurality of dominant error events, means for choosing a dominant error event having a least penalty metric value from the identified plurality of dominant error events, and means for calculating an approximation to a logarithmic likelihood ratio for the input symbol based on the survivor path and the chosen dominant error event. The communication channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a fifth aspect, the invention provides an apparatus for accessing data from a hard disk drive using a read channel. The read channel is associated with a predetermined plurality of dominant error events. The read channel includes a decoder means for decoding data accessed by the apparatus. The decoder means includes a Viterbi detector means for detecting a survivor path for an input symbol and for making a hard decision about a polarity of the input symbol based on the survivor path, means for determining which of the plurality of dominant error events are possible dominant error events with respect to the input symbol, means for determining which of the possible dominant error events has a least penalty metric with respect to the survivor path, and means for calculating an approximation to a logarithmic likelihood ratio for the input symbol based on the survivor path and the determined possible dominant error event having the least penalty metric. The read channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a sixth aspect, a method of reducing complexity in a Viterbi decoding algorithm used in a communication channel is provided. The method includes the steps of identifying a survivor path for an input symbol, making a hard decision about a polarity of the input symbol based on the identified survivor path, identifying a plurality of dominant error events for which the opposite polarity would be determined for the input symbol, measuring a penalty metric value based on the identified survivor path for each of the plurality of dominant error events, choosing a dominant error event having a least penalty metric value from the identified plurality of dominant error events, and calculating an approximation to a logarithmic likelihood ratio for the input symbol based on the survivor path and the chosen dominant error event. The communication channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a seventh aspect, a method of accessing data from a hard disk drive using a read channel is provided. The read channel is associated with a predetermined plurality of dominant error events. The method includes the steps of identifying a survivor path for an input symbol, making a hard decision about a polarity of the input symbol based on the identified survivor path, identifying a plurality of dominant error events for which the opposite polarity would be determined for the input symbol, measuring a penalty metric value based on the identified survivor path for each of the plurality of dominant error events, choosing a dominant error event having a least penalty metric value from the identified plurality of dominant error events, and calculating an approximation to a logarithmic likelihood ratio for the input symbol based on the survivor path and the chosen dominant error event. The read channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with an eighth aspect, the invention provides a method of decoding convolutionally encoded data accessed by a read channel for a hard disk drive. The read channel is associated with a predetermined plurality of dominant error events. The method includes the steps of identifying a survivor path for an input symbol, making a hard decision about a polarity of the input symbol based on the identified survivor path, identifying a plurality of dominant error events for which the opposite polarity would be determined for the input symbol, measuring a penalty metric value based on the identified survivor path for each of the plurality of dominant error events, choosing a dominant error event having a least penalty metric value from the identified plurality of dominant error events, and calculating an approximation to a logarithmic likelihood ratio for the input symbol based on the survivor path and the chosen dominant error event. The read channel may be a controlled intersymbol interference channel, which may be capable of being modeled as a finite impulse response (FIR) filter. The controlled intersymbol interference channel may be a partial response channel, such as either a partial response class-IV (PR4) channel, an extended partial response class-IV (EPR4) channel.

In accordance with a ninth aspect, the invention provides a storage medium for storing software for implementing each of the methods described above. The software is computer-readable.

In accordance with a tenth aspect of the present invention, a decoder for decoding data from a communication channel includes a sequence detector configured to detect a survivor path for an input symbol and to make a hard decision about the input symbol based on the survivor path. The channel is associated with a predetermined plurality of dominant error events. The decoder includes circuitry configured to determine which of the plurality of dominant error events are possible dominant error events with respect to a sequence detector output. The decoder includes circuitry configured to determine which of the possible dominant error events has a least penalty metric with respect to the survivor path. The decoder also includes a calculator configured to compute an approximation to a soft reliability information for the input symbol based on the survivor path and the determined possible dominant error event having the least penalty metric.

According to the tenth aspect, the sequence detector can comprise a Viterbi detector. The communication channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel.

According to an eleventh aspect of the present invention, a read channel for a hard disk drive includes a decoder for decoding data accessed by the read channel. The decoder includes a sequence detector configured to detect a survivor path for an input symbol and to make a hard decision about the input symbol based on the survivor path. The read channel is associated with a predetermined plurality of dominant error events. The decoder includes circuitry configured to determine which of the plurality of dominant error events are possible dominant error events with respect to a sequence detector output. The decoder includes circuitry configured to determine which of the possible dominant error events has a least penalty metric with respect to the survivor path. The decoder includes a calculator configured to compute an approximation to a soft reliability information for the input symbol based on the survivor path and the determined possible dominant error event having the least penalty metric.

According to the eleventh aspect, the sequence detector can comprise a Viterbi detector. The read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel.

According to a twelfth aspect of the present invention, a disk drive for accessing data includes a read channel. The read channel includes a decoder for decoding data accessed by the disk drive. The decoder includes a sequence detector configured to detect a survivor path for an input symbol and to make a hard decision about the input symbol based on the survivor path. The read channel is associated with a predetermined plurality of dominant error events. The decoder includes circuitry configured to determine which of the plurality of dominant error events are possible dominant error events with respect to a sequence detector output. The decoder includes circuitry configured to determine which of the possible dominant error events has a least penalty metric with respect to the survivor path. The decoder also includes a calculator configured to compute an approximation to a soft reliability information for the input symbol based on the survivor path and the determined possible dominant error event having the least penalty metric.

According to the twelfth aspect, the read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel.

According to a thirteenth aspect of the present invention, an apparatus for reducing complexity in detecting input symbols in a communication channel includes means for identifying a survivor path for an input symbol. The apparatus includes means for making a hard decision about the input symbol based on the identified survivor path. The apparatus includes means for identifying a plurality of dominant error events for which the opposite polarity would be determined for an output of the means for making the hard decision. The apparatus includes means for measuring a penalty metric value based on the identified survivor path for each of the plurality of dominant error events. The apparatus includes means for choosing a dominant error event having a least penalty metric value from the identified plurality of dominant error events. The apparatus also includes means for calculating an approximation to a soft reliability information for the input symbol based on the survivor path and the chosen dominant error event.

According to the thirteenth aspect, the communication channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. The means for identifying the survivor path for the input symbol can comprise one of means for decision feedback equalizing and means for minimum mean square equalizing.

According to a fourteenth aspect of the present invention, an apparatus for accessing data from a hard disk drive uses a read channel. The read channel includes a decoder means for decoding data accessed by the apparatus. The decoder means includes a sequence detector means for detecting a survivor path for an input symbol and for making a hard decision about the input symbol based on the survivor path. The read channel is associated with a predetermined plurality of dominant error events. The decoder means includes means for determining which of the plurality of dominant error events are possible dominant error events with respect to an output of the sequence detector means. The decoder means includes means for determining which of the possible dominant error events has a least penalty metric with respect to the survivor path. The decoder means includes means for calculating an approximation to a soft reliability information for the input symbol based on the survivor path and the determined possible dominant error event having the least penalty metric.

According to the fourteenth aspect, the sequence detector means can comprise a Viterbi detector means. The read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel.

According to a fifteenth aspect of the present invention, a method of reducing complexity in detecting input symbols in a communication channel includes the steps of: identifying a survivor path for an input symbol; making a hard decision about the input symbol based on the identified survivor path; identifying a plurality of dominant error events for which the opposite polarity would be determined for an output of the step of making the hard decision; measuring a penalty metric value based on the identified survivor path for each of the plurality of dominant error events; choosing a dominant error event having a least penalty metric value from the identified plurality of dominant error events; and calculating an approximation to a soft reliability information for the input symbol based on the survivor path and the chosen dominant error event.

According to the fifteenth aspect, the communication channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. The step of identifying the survivor path for the input symbol can comprise the step of one of decision feedback equalizing and minimum mean square equalizing.

According to a sixteenth aspect of the present invention, a method of accessing data from a hard disk drive that uses a read channel includes the steps of: identifying a survivor path for an input symbol; making a hard decision about the input symbol based on the identified survivor path, wherein the read channel is associated with a predetermined plurality of dominant error events; identifying a plurality of dominant error events for which the opposite polarity would be determined for an output of the step of making the hard decision; measuring a penalty metric value based on the identified survivor path for each of the plurality of dominant error events; choosing a dominant error event having a least penalty metric value from the identified plurality of dominant error events; and calculating an approximation to a soft reliability information for the input symbol based on the survivor path and the chosen dominant error event.

According to the sixteenth aspect, the read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. The step of identifying the survivor path for the input symbol can comprise the step of one of decision feedback equalizing and minimum mean square equalizing.

According to a seventeenth aspect of the present invention, a method of decoding data accessed by a read channel for a hard disk drive includes the steps of: identifying a survivor path for an input symbol; making a hard decision about the input symbol based on the identified survivor path, wherein the read channel is associated with a predetermined plurality of dominant error events; identifying a plurality of dominant error events for which the opposite polarity would be determined for an output of the step of making the hard decision; measuring a penalty metric value based on the identified survivor path for each of the plurality of dominant error events; choosing a dominant error event having a least penalty metric value from the identified plurality of dominant error events; and calculating an approximation to a soft reliability information for the input symbol based on the survivor path and the chosen dominant error event.

According to the seventeenth aspect, the read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. The step of identifying the survivor path for the input symbol can comprise the step of one of decision feedback equalizing and minimum mean square equalizing.

According to an eighteenth aspect of the present invention, a storage medium for stores software for implementing a sequence decoding algorithm used in a communication channel. The software is computer-readable. The software includes instructions for causing a computer to: identify a survivor path for an input symbol; make a hard decision about the input symbol based on the identified survivor path; identify a plurality of dominant error events for which the opposite polarity would be determined for an output of the step of making the hard decision; measure a penalty metric value based on the identified survivor path for each of the plurality of dominant error events; choose a dominant error event having a least penalty metric value from the identified plurality of dominant error events; and calculate an approximation to a soft reliability information for the input symbol based on the survivor path and the chosen dominant error event.

According to the eighteenth aspect, the sequence decoding algorithm can comprise a Viterbi decoding algorithm.

The communication channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. To identify the survivor path for the input symbol, the software can include instructions for causing the computer to one of decision feedback equalize and minimum mean square equalize.

According to a nineteenth aspect of the present invention, a storage medium for storing software for accessing data from a hard disk drive uses a read channel. The read channel is associated with a predetermined plurality of dominant error events. The software is computer-readable. The software includes instructions for causing a computer to: identify a survivor path for an input symbol; make a hard decision about the input symbol based on the identified survivor path; identify a plurality of dominant error events for which the opposite polarity would be determined for an output of the step of making the hard decision; measure a penalty metric value based on the identified survivor path for each of the plurality of dominant error events; choose a dominant error event having a least penalty metric value from the identified plurality of dominant error events; and calculate an approximation to a soft reliability information for the input symbol based on the survivor path and the chosen dominant error event.

According to the nineteenth aspect, the read channel can comprise a controlled intersymbol interference channel. The controlled intersymbol interference channel can be capable of being modeled as a finite impulse response (FIR) filter. The controlled intersymbol interference channel can comprise a partial response channel. The partial response channel can comprise a partial response class-IV (PR4) channel. The partial response channel can comprise an extended partial response class-IV (EPR4) channel. To identify the survivor path for the input symbol, the software includes instructions for causing the computer to one of decision feedback equalize and minimum mean square equalize.

According to a twentieth aspect of the present invention, a storage medium stores software for decoding data accessed by a read channel for a hard disk drive. The read channel is associated with a predetermined plurality of dominant error events. The software is computer-readable. The software includes instructions for causing a computer to: identify a survivor path for an input symbol; make a hard decision about the input symbol based on the identified survivor path; identify a plurality of dominant error events for which the opposite polarity would be determined for an output of the step of making the hard decision; measure a penalty metric value based on the identified survivor path for each of the plurality of dominant error events; choose a dominant error event having a least penalty metric value from the identified plurality of dominant error events; and calculate an approximation to a soft reliability information for the input symbol based on the survivor path and the chosen dominant error event.

According to the twentieth aspect, the read channel can comprise a controlled intersymbol interference channel. The controlled intersymbol interference channel being capable of being modeled as a finite impulse response (FIR) filter. The controlled intersymbol interference channel can comprise a partial response channel. The partial response channel can comprise a partial response class-IV (PR4) channel.

The partial response channel can comprise an extended partial response class-IV (EPR4) channel. To identify the survivor path for the input symbol, the software includes instructions for causing the computer to one of decision feedback equalize and minimum mean square equalize.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 2:
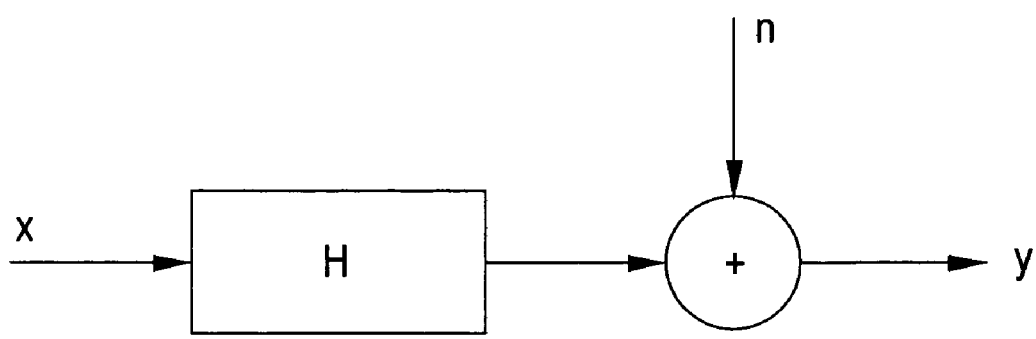
FIG. 2 shows a block diagram of a finite-impulse response filter model of a controlled ISI channel.

Referring to FIG. 2, a controlled intersymbol interference (ISI) channel can be modeled as a finite impulse response (FIR) filter, because it has finite response length. Examples of such a channel include the partial response class-IV (PR4) channel (i.e., $1-D^2$), the extended partial response class-IV (EPR4) channel (i.e., $1+D^2-D^3$), the "221" channel ($2+2D-D^2-2D^1-D^4$), etc., all of which are used to model magnetic recording channels. A controlled ISI channel such as one of these is often used, for example, as a read channel in a disk drive.

Figure 1:
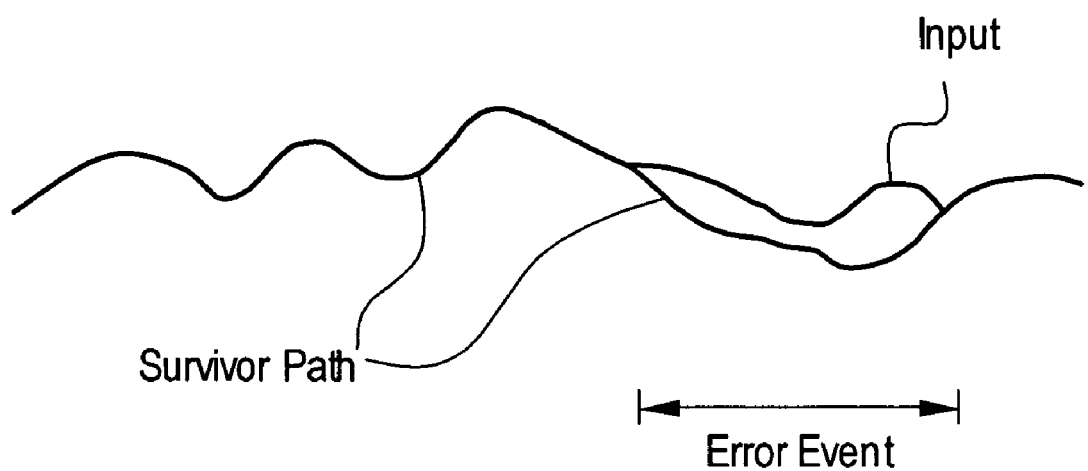
FIG. 1 illustrates a survivor path and an error event for a Viterbi detection of a convolutional code.

Controlled ISI channels can be represented by trellis. Viterbi detection is commonly used to decode the inputs to such channels. A Viterbi detector tries to find the minimum metric path (referred to as the "survivor path") through the channel trellis. Where the path metric is the squared distance (Euclidean distance) between the noiseless channel output corresponding to the path and the received noisy channel samples. Referring to FIG. 1, an error event occurs if the survivor path does not correspond to the true inputs. Such a situation is possible if the true input path does not correspond to the minimum metric path, which can result from noise in the channel output samples.

Dominant error events are the most likely error events for controlled ISI channels, because the difference metrics between dominant error event paths and the true input path are small. Because of these small difference metrics, it is easy to mistake the dominant error event paths for the true input path. For controlled ISI channels, the dominant error event paths are readily identifiable. For example, for the "221" channel, the dominant error events are "+–+", "+", and "+–".

Turbo codes, LDPC codes, and other convolutional codes require probabilistic (i.e., soft) information for each channel input symbol. Referring to FIG. 2, a controlled ISI channel may be modeled as an FIR filter having transfer function H. To obtain the needed soft information, the logarithmic likelihood ratio (LLR) must be calculated using Equation (1) below:

$$LLR(x_k) = \log\frac{P(x_k=+1)}{P(x_k=-1)} = \log\frac{\sum_{\text{all paths such that } x_k=+1} P(\text{each such path})}{\sum_{\text{all paths such that } x_k=-1} P(\text{each such path})} \quad (1)$$

Traditional soft-decoding methods, such as the BCJR algorithm or the soft-output Viterbi algorithm (SOVA), attempt to find the probabilities for all or most of the paths and then carry out Equation (1). However, for controlled ISI channels, the survivor path and the paths corresponding to the dominant error events are the most likely paths through the trellis. Thus, Equation (1) can be approximated by Equation (2) below for a controlled ISI channel:

$$\log\frac{P(x_k=+1)}{P(x_k=-1)} \approx \log\frac{P(\text{the most likely path such that } x_k=+1)}{P(\text{the most likely path such that } x_k=-1)} \quad (2)$$

Without loss of generality, it may be assumed that the survivor path corresponds to $x_k=+1$. This assumption leads to Equation (3):

$$\log\frac{P(x_k=+1)}{P(x_k=-1)} \approx \log\frac{P(\text{survivor path})}{P(\text{error event with the least penalty metric such that } x_k=-1)} \quad (3)$$

Therefore, referring to FIG. 3, a preferred embodiment of a new soft-output decoding algorithm 350 can be described as follows. The first step 355 is to find the survivor path of the Viterbi detector. The second step 360 is to make a hard decision $x_k$ based on the survivor path. The third step 365 is to then, from all of the dominant error events, identify the ones that would change the polarity (from 1 to 0, or from 0 to 1) of the decision $x_k$. The fourth step 370 is to then, from among all of the error events so identified, choose the one that has the minimum penalty metric as compared with the survivor path. Finally, the last step 375 is to use Equation (3) to calculate the soft information about input symbol $x_k$ based on the chosen error event.

In summary, the knowledge about the dominant error events greatly reduces the search space for the paths in Equation (1), therefore making it possible to extract the soft information about $x_k$ without back-tracing along the channel trellis as performed by the BCJR algorithm or the SOVA. As a result, the decoding complexity is greatly reduced, at the expense of slight degradation in performance.

Referring again to FIG. 2, vector x denotes the input to the channel, and the decision vector from the Viterbi survivor path is denoted $x_v$. The error vector is denoted $x_e$, therefore, $x_e = x - x_v$, and additive white Gaussian noise (AWGN) is assumed. Therefore, the channel model of FIG. 2 yields Equation 4 below:

$$y - (H(x_v + x_e)) \sim N(0, \sigma^2 I) \quad (4)$$

where denotes the convolution operation, and I stands for the identity matrix.

According to the probability density function of the Gaussian noise, the probability of the survivor path $x_v$ is given by Equation (5) below:

$$P(x_v) \propto \exp\left(-\frac{\|y - H \otimes x_v\|^2}{2\sigma^2}\right) \quad (5)$$

Where the squared absolute value term denotes the squared distance of a vector. Equation (5) indicates that large squared distance corresponds to small probability and vice versa. Therefore, squared absolute value term is often referred to as the penalty metric of the path $x_v$. The Viterbi detector finds the path with the minimum penalty metric, thus the maximum probability.

Suppose it is desired to calculate the LLR of bit k. Without loss of generality, it is assumed that the Viterbi survivor path $x_v$ corresponds to $x_k=+1$. The set of all error events corresponding to $x_k=-1$ is denoted $X_e$. For any specific error event $x_e \in X_e$, its probability is given by Equation (6) below:

$$P(x_e) \propto \exp\left(-\frac{\|y - H \otimes (x_v + x_e)\|^2}{2\sigma^2}\right) \quad (6)$$

If $x_{e,min}$ denotes the error event in $X_e$ that has the largest probability (i.e., the least penalty metric), then Equations (3) and (6) can be combined to produce Equation (7) below:

$$LLR(x_k) = \log \frac{C \cdot \exp\left(-\frac{\|y - H \otimes x_v\|^2}{2\sigma^2}\right)}{C \cdot \exp\left(-\frac{\|y - H \otimes (x_v + x_{e,min})\|^2}{2\sigma^2}\right)} = \quad (7)$$

$$\frac{1}{2\sigma^2}\left(\sum_{i=1}^{L}(y_i - (H \otimes x_v)_i)^2 - \right.$$

$$\left.\sum_{i=1}^{L}(y_i - (H \otimes x_v)_i - (H \otimes x_{e,min})_i)^2\right) = -\frac{1}{2\sigma^2}$$

$$\left(\sum_{i:(H \otimes x_{e,min})_i \neq 0}(2(y_i - (H \otimes x_v)_i) \cdot (H \otimes x_{e,min})_i) - \right.$$

$$\left.\|H \otimes x_{e,min}\|^2\right)$$

where L is the block length. If the Viterbi survivor path $x_v$ corresponds to $x_k=-1$, then Equation (8) is produced:

$$LLR(x_k) = \quad (8)$$

$$\frac{1}{2\sigma^2}\left(\sum_{i:(H \otimes x_{e,min})_i \neq 0}(2(y_i - (H \otimes x_v)_i) \cdot (H \otimes x_{e,min})_i) - \right.$$

$$\left.\|H \otimes x_{e,min}\|^2\right)$$

To implement this algorithm, the set $X_e$ is confined so that it contains only the dominant error events that would change the Viterbi decision at time k. For example, the dominant error events for the H=[2 2 −1 −2 −1] channel are

{(1), (1, −1), (1, −1, 1), (1, −1, 1, −1, 1)}.

Any shift or inverse of the list error events is also a dominant error event, so long as such an error event may possibly occur. Referring to FIG. 4, an example is shown using the H=[2 2 −1 −2 −1] channel and its dominant error events to illustrate how to construct the set $X_e$ from the dominant error event list and the Viterbi hard decisions, per step 365 in FIG. 3. A sequence of bits 405 represents the Viterbi hard decisions $x_v$. A particular bit 410 is designated as the $k^{th}$ bit in the sequence 405, and thus it represents $x_k$.

Figure 3:
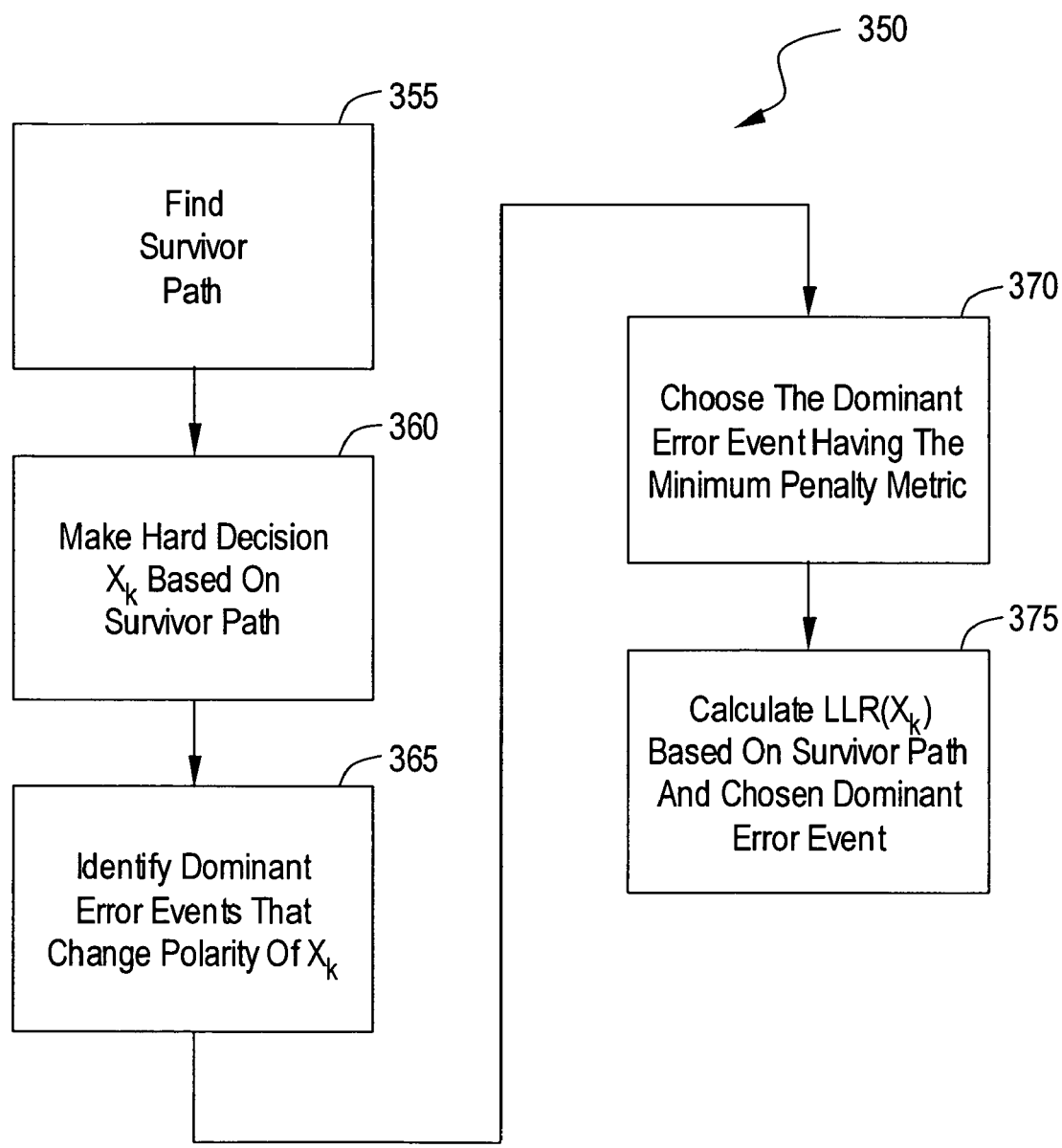
FIG. 3 shows a flow chart of a method for calculating a logarithmic likelihood ratio according to the present invention.
Figure 4:
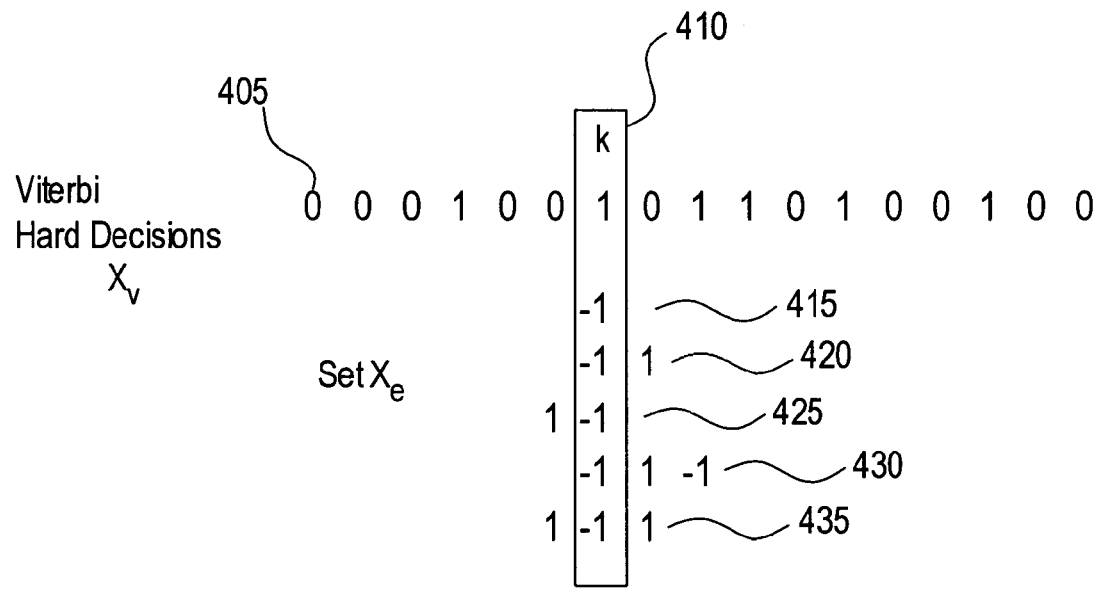
FIG. 4 shows a construction of a set of dominant error events for a particular channel.

To construct the set $X_e$, as per step 365 in FIG. 3, each possible dominant error event, including any shift or inverse of each possible dominant error event, is checked against the $x_k$ bit 410 and its nearest neighboring bits within the $x_v$ sequence 405 to see whether that dominant error event may possibly have occurred. As shown above, the first dominant error event for the H channel is (1), i.e., a one-bit error. As shown in FIG. 4, $x_k=1$, so (1) would not be an error at all. However, the inverse of (1) is (−1), and this would be an error, thus it is a possible error, and it is designated as the first possible dominant error event 415 within the set $X_e$.

The second dominant error event for the H channel is (1, −1). This is a two-bit error, so it must be compared with a two-bit sequence within $x_v$. First, it is checked against ($x_k$, $x_{k+1}$): $x_k=1$ and $x_{k+1}=0$, so this would not be an error; however, the inverse of this dominant error event is (−1, 1), and this would be a possible error. Thus, it is designated as the second possible dominant error event 420 within the set $X_e$. Then, the same event is checked against the sequence of ($x_{k-1}$, $x_k$), and it is found that (1, −1) is a possible dominant error corresponding to that sequence, and it is designated as the third possible dominant error event 425 within the set $X_e$. The next dominant error event for the H channel is (1, −1, 1). This is a three-bit error, so it can be shifted into three possible positions that include $x_k$, and it can also be inverted, so there are six possibilities to be checked. After checking, it is seen that the (−1, 1, −1) event 430 is a possibility for the sequence of ($x_k$, $x_{k+1}$, $x_{k+2}$), and the (1, −1, 1) event 435 is a possibility for the ($X_{k-1}$, $X_k$, $X_{k+1}$) sequence. Finally, the last event to be checked is the (1, −1, 1, −1, 1) five-bit event. This event has ten permutations, including five shift positions having two inverses each. After checking, it is seen that it is impossible for any permutation of this event to occur in such a way that $x_k$ is included. Thus, the set $X_e$ is complete, and its elements include the five dominant error events 415, 420, 425, 430, 435 that are possibilities corresponding to $x_k$.

Figure 5:
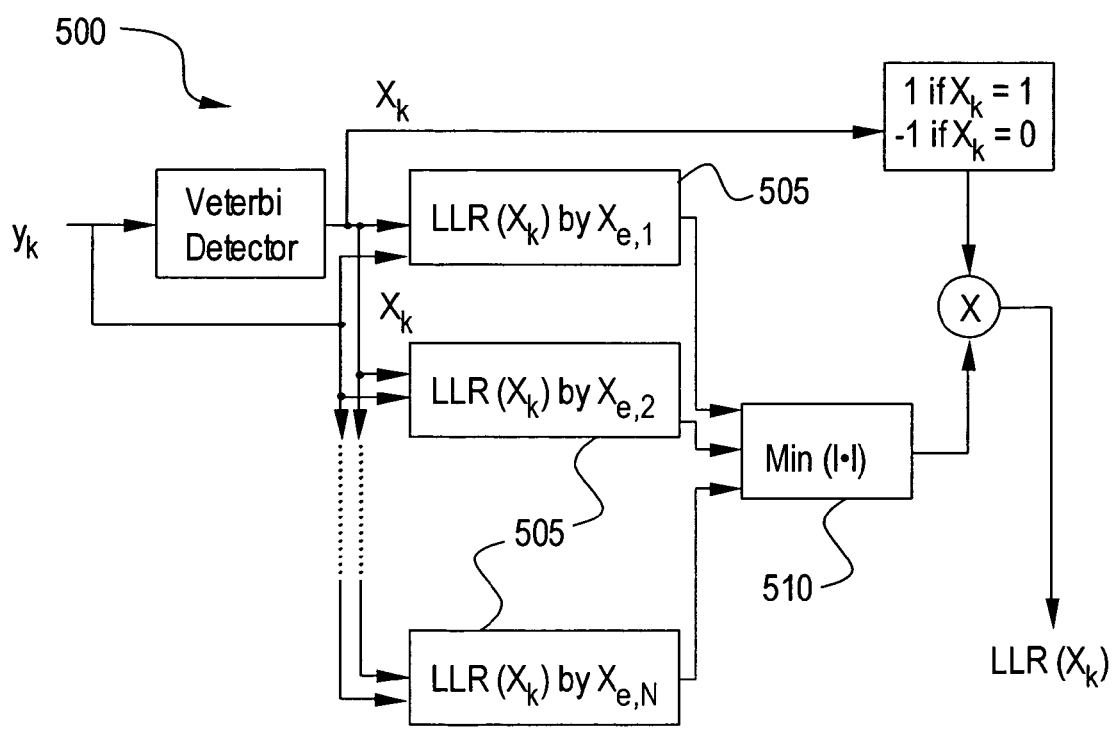
FIG. 5 shows a block diagram of a method of calculating the LLR for a given input, according to the present invention.
Figure 6:
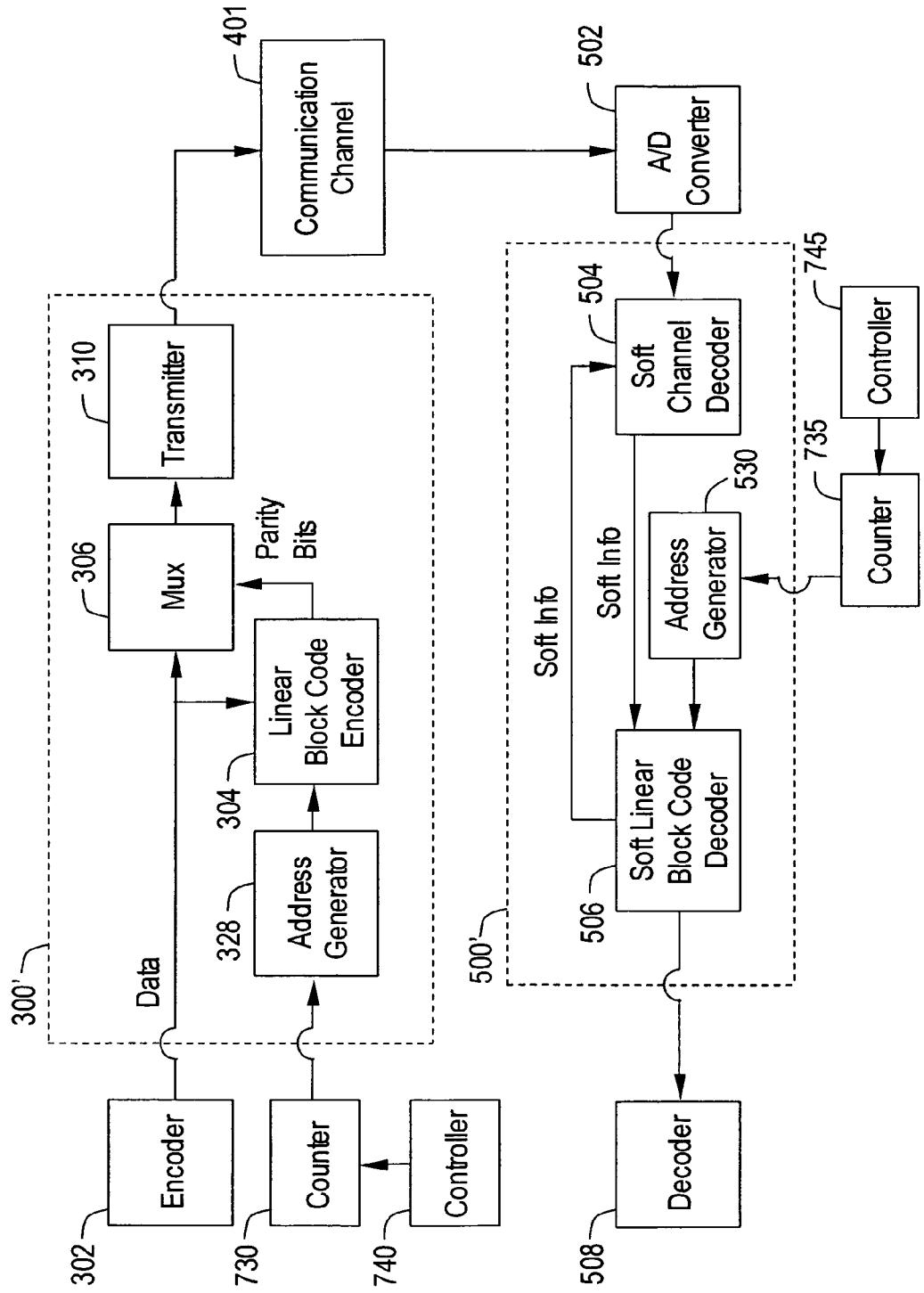
FIG. 6 is a block diagram of a data transmission system.

Referring to FIG. 5, a block diagram 500 shows how to calculate the LLR value based on $X_e$, the channel output y, and the Viterbi decision $x_v$, as per steps 370 and 375 in FIG. 3. Continuing with the example described above with reference also to FIG. 4, each of the five elements of the set $X_e$ are plugged into Equation (6), as indicated by the blocks 505 showing the calculation of LLR($x_k$) for each respective element of $X_e$. Once these five calculations are completed, the minimum of these five is found, per block 510. This corresponds to the dominant error event having the least penalty metric. Finally, this result is multiplied by the sign of the survivor path itself, as per Equation (8), to produce LLR($x_k$), which is the desired soft information corresponding to $x_k$.

The method described herein reduces the complexity of the Viterbi decoding algorithm by approximating the summations in the numerator and the denominator of Equation (1) using only the survivor path and the dominant error event having the least penalty metric, respectively. The tradeoff for these approximations is a slight degradation in performance. It is noted that a preferred embodiment of the invention is an application of the decoding method described above in a read channel in a hard disk drive. Experimentation with such a read channel implementation has shown that this performance degradation is equivalent to a reduction in the signal-to-noise ratio (SNR) of about 0.3 dB. However, because the calculation is so much simpler, there is a tremendous savings in memory, in that the state memory is not needed at all. Furthermore, there is also an energy savings of about 50% as compared to the energy consumption for performing the full calculation of Equation (1).

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. For example, it is to be understood that the invention is applicable to communications channels other than controlled ISI channels that use soft-output decoding schemes. The scope of the following claims is to be accorded the broadest interpretation so as to encompass all such modifications and equivalent structures and functions.

What is claimed is:

1. A decoder for decoding data from a communication channel, the communication channel being associated with a predetermined plurality of dominant error events, the decoder comprising:
   a detector configured to detect a survivor path for an input symbol and to make a hard decision about the input symbol based on the survivor path;
   circuitry configured to determine which of the plurality of dominant error events are possible dominant error events with respect to a detector output;
   circuitry configured to determine which of the possible dominant error events has a least penalty metric with respect to the survivor path; and
   a calculator configured to compute an approximation to a soft reliability information for the input symbol based on the survivor path and the determined possible dominant error event having the least penalty metric.

2. The decoder of claim 1, wherein the detector comprises a sequence detector.

3. The decoder of claim 2, wherein the sequence detector comprises a Viterbi detector.

4. The decoder of claim 1, wherein the communication channel comprises a controlled intersymbol interference channel.

5. The decoder of claim 4, wherein the controlled intersymbol interference channel is capable of being modeled as a finite impulse response (FIR) filter.

6. The decoder of claim 5, wherein the controlled intersymbol interference channel comprises a partial response channel.

7. The decoder of claim 6, wherein the partial response channel comprises a partial response class-IV (PR4) channel.

8. The decoder of claim 6, wherein the partial response channel comprises an extended partial response class-IV (EPR4) channel.

9. A read channel for a hard disk drive, the read channel being associated with a predetermined plurality of dominant error events, and the read channel including a decoder for decoding data accessed by the read channel, the decoder comprising the decoder of claim 1.

10. A disk drive for accessing data, the disk drive comprising a read channel, the read channel being associated with a predetermined plurality of dominant error events, and the read channel including a decoder for decoding data accessed by the disk drive, the decoder comprising the decoder of claim 1.

11. An apparatus for decoding data from a communication channel, the communication channel being associated with a predetermined plurality of dominant error events, the apparatus comprising:
    a detector means for detecting a survivor path for an input symbol and for making a hard decision about the input symbol based on the survivor path;
    means for determining which of the plurality of dominant error events are possible dominant error events with respect to an output of the detector means;
    means for determining which of the possible dominant error events has a least penalty metric with respect to the survivor path; and
    means for calculating an approximation to a soft reliability information for the input symbol based on the survivor path and the determined possible dominant error event having the least penalty metric.

12. The apparatus of claim 11, wherein the detector means comprises a sequence detector means.

13. The apparatus of claim 12, wherein the sequence detector means comprises a Viterbi detector means.

14. The apparatus of claim 11, wherein the communication channel comprises a controlled intersymbol interference channel.

15. The apparatus of claim 14, wherein the controlled intersymbol interference channel is capable of being modeled as a finite impulse response (FIR) filter.

16. The apparatus of claim 15, wherein the controlled intersymbol interference channel comprises a partial response channel.

17. The apparatus of claim 16, wherein the partial response channel comprises a partial response class-IV (PR4) channel.

18. The apparatus of claim 16, wherein the partial response channel comprises an extended partial response class-IV (EPR4) channel.

19. A method of reducing complexity in detecting input symbols in a communication channel, comprising the steps of:
    a.) identifying a survivor path for an input symbol;
    b.) making a hard decision about the input symbol based on the identified survivor path;
    c.) identifying a plurality of dominant error events for which the opposite polarity would be determined for an output of step (b);
    d.) measuring a penalty metric value based on the identified survivor path for each of the plurality of dominant error events;

e.) choosing a dominant error event having a least penalty metric value from the identified plurality of dominant error events; and f.) calculating an approximation to a soft reliability information for the input symbol based on the survivor path and the chosen dominant error event.

20. The method of claim 19, wherein the communication channel comprises a controlled intersymbol interference channel.

21. The method of claim 20, wherein the controlled intersymbol interference channel is capable of being modeled as a finite impulse response (FIR) filter.

22. The method of claim 21, wherein the controlled intersymbol interference channel comprises a partial response channel.

23. The method of claim 22, wherein the partial response channel comprises a partial response class-IV (PR4) channel.

24. The method of claim 22, wherein the partial response channel comprises an extended partial response class-IV (EPR4) channel.

25. The method of claim 19, wherein the step (a) comprises the step of:

g.) one of decision feedback equalizing and minimum mean square equalizing.

* * * * *

UNITED STATES PATENT AND TRADEMARK OFFICE
CERTIFICATE OF CORRECTION

PATENT NO. : 7,319,726 B1
APPLICATION NO. : 11/217408
DATED : January 15, 2008
INVENTOR(S) : Zining Wu et al.

It is certified that error appears in the above-identified patent and that said Letters Patent is hereby corrected as shown below:

| | |
|---|---|
| Column 2, Line 26 | Delete "maybe" and insert -- may be -- |
| Column 9, Line 50 | Delete "stores" and insert -- storing -- |
| Column 11, Line 39 | Delete "-2D$^2$" and insert -- -2D$^3$ -- |
| Column 12, Line 63 | Delete "X" and insert -- x -- |
| Column 12, Line 67 | After "H" in the equation insert -- $\otimes$ -- |
| Column 13, Line 1 | Insert -- $\otimes$ -- after "where" |
| Column 13, Line 43 | Insert -- - -- before $\frac{1}{2\sigma^2}$ in Equation 7 |
| Column 14, Line 42 | Delete "X$_k$" and insert -- x$_k$ -- |
| Column 14, Line 51 | Delete "(X$_{k-1}$, X$_k$, X$_{k+1}$)" and insert -- (x$_{k-1}$, x$_k$, x$_{k+1}$) -- |

Signed and Sealed this

Thirty-first Day of March, 2009

JOHN DOLL
*Acting Director of the United States Patent and Trademark Office*